(12) United States Patent
Lee et al.

(10) Patent No.: US 11,978,853 B2
(45) Date of Patent: May 7, 2024

(54) METHOD FOR MANUFACTURING ELECTRODE COMPRISING POLYMER-BASED SOLID ELECTROLYTE AND ELECTRODE MANUFACTURED BY THE METHOD

(71) Applicant: LG Chem, Ltd., Seoul (KR)

(72) Inventors: Jung-Pil Lee, Daejeon (KR); Eun-Bee Kim, Daejeon (KR); Ji-Hoon Ryu, Daejeon (KR); Sung-Joong Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 594 days.

(21) Appl. No.: 17/269,128

(22) PCT Filed: Sep. 27, 2019

(86) PCT No.: PCT/KR2019/012625
§ 371 (c)(1),
(2) Date: Feb. 17, 2021

(87) PCT Pub. No.: WO2020/067792
PCT Pub. Date: Apr. 2, 2020

(65) Prior Publication Data
US 2021/0249688 A1  Aug. 12, 2021

(30) Foreign Application Priority Data
Sep. 28, 2018 (KR) .................. 10-2018-0116522

(51) Int. Cl.
*H01M 10/00* (2006.01)
*H01M 4/04* (2006.01)
*H01M 4/139* (2010.01)
*H01M 10/0565* (2010.01)

(52) U.S. Cl.
CPC ..... *H01M 10/0565* (2013.01); *H01M 4/0404* (2013.01); *H01M 4/139* (2013.01); *H01M 2300/0037* (2013.01)

(58) Field of Classification Search
CPC ........ H01M 4/13; H01M 4/366; H01M 4/131; H01M 4/139; H01M 10/0565; H01M 4/0404
See application file for complete search history.

(56) References Cited

U.S. PATENT DOCUMENTS 9,755,273 B2 * 9/2017 DeSimone ............ H01M 12/06
2001/0016290 A1   8/2001 Kezuka
(Continued)

FOREIGN PATENT DOCUMENTS

CN   1518141 A        8/2004
JP   2004022332 A *   1/2004   ............ H01G 11/22
(Continued)

OTHER PUBLICATIONS

Lee et al., A Method for Manufacturing an Electrode Comprising Polymer Electrolyte and an Electrode Manufactured Thereby, Sep. 2018, See the Abstract. (Year: 2018).*

(Continued)

*Primary Examiner* — Cynthia H Kelly
*Assistant Examiner* — Monique M Wills
(74) *Attorney, Agent, or Firm* — Lerner David LLP (57) ABSTRACT

The present disclosure relates to an electrode for an all solid-state battery and a manufacturing method thereof, and a mixture of a polymer-based solid electrolyte and a conductive material is filled between electrode active material particles that constitute an electrode active material layer, to increase the contact between the electrode active material particles and the conductive material through a solvent annealing process included in a manufacturing process, thereby improving ionic conductivity in the electrode and capacity in the electrode.

19 Claims, 4 Drawing Sheets

(56) References Cited

U.S. PATENT DOCUMENTS

| | | |
|---|---|---|
| 2004/0146781 A1 | 7/2004 | Ohsawa et al. |
| 2014/0273290 A1 | 9/2014 | Somervell |
| 2017/0263977 A1 | 9/2017 | Jeon et al. |
| 2018/0159169 A1 | 6/2018 | Ko et al. |
| 2019/0237757 A1 | 8/2019 | Lee et al. |

FOREIGN PATENT DOCUMENTS

| | | | | |
|---|---|---|---|---|
| JP | 2006164783 A | 6/2006 | | |
| JP | 4355970 B2 | 11/2009 | | |
| JP | 2013116934 A | 6/2013 | | |
| KR | 100376051 B1 | 6/2003 | | |
| KR | 20150061538 A | 6/2015 | | |
| KR | 20170051324 A | 5/2017 | | |
| KR | 20170100783 A | 9/2017 | | |
| KR | 20170105283 A | 9/2017 | | |
| KR | 20180004592 A | 1/2018 | | |
| KR | 20180102024 A | * 9/2018 | .............. | H01M 4/13 |
| WO | 2018164455 A1 | 9/2018 | | |

OTHER PUBLICATIONS

Tsutsumi et al., Electrode Using Fibrous Hydrogen Storage Alloy, Battery Using Fibrous Hydrogen Storage Alloy and Electric Double Layer Capacitor, Jan. 2004, See the Abstract. (Year: 2004).*
International Search Report for PCT/KR2019/012625 dated Jan. 23, 2020; 2 pages.
Extended European Search Report including Written Opinion for Application No. 19865790.0 dated Sep. 9, 2021, pp. 1-9.

* cited by examiner

METHOD FOR MANUFACTURING ELECTRODE COMPRISING POLYMER-BASED SOLID ELECTROLYTE AND ELECTRODE MANUFACTURED BY THE METHOD

TECHNICAL FIELD

The present application claims the benefit of Korean Patent Application No. 10-2018-0116522 filed on Sep. 28, 2018 with the Korean Intellectual Property Office, the disclosure of which is incorporated herein by reference in its entirety. The present disclosure relates to a method for manufacturing an electrode comprising a polymer-based solid electrolyte as an electrolyte material, and an electrode manufactured by the method.

BACKGROUND ART

A lithium ion battery using a liquid electrolyte has a structure in which a negative electrode and a positive electrode are separated by a separator, and when the separator is damaged by deformation or external impacts, a short may occur, leading to fires or explosion. Accordingly, development of solid electrolytes with safety is a very important aim in the field of lithium ion secondary batteries.

A lithium secondary battery using a solid electrolyte has enhanced battery safety, reduced electrolyte leaks and improved battery reliability, and is easy to manufacture thin batteries. Additionally, lithium metal is used for the negative electrode to improve the energy density, and accordingly a lithium secondary battery using a solid electrolyte gains attention as a next-generation battery since it is expected to be used in a range of applications including small secondary batteries and high capacity secondary batteries for electric vehicles.

However, a lithium secondary battery using a solid electrolyte has lower ionic conductivity than a battery using a liquid electrolyte and reduces in output characteristics especially at low temperatures. Additionally, a solid electrolyte has lower surface contact with the active material than a liquid electrolyte, resulting in increased interfacial resistance, and a conductive material is distributed in the solid electrolyte while being in non-contact with the electrode active material, so the output characteristics or capacity characteristics decrease relative to the quantity of conductive material used.

Figure 1:
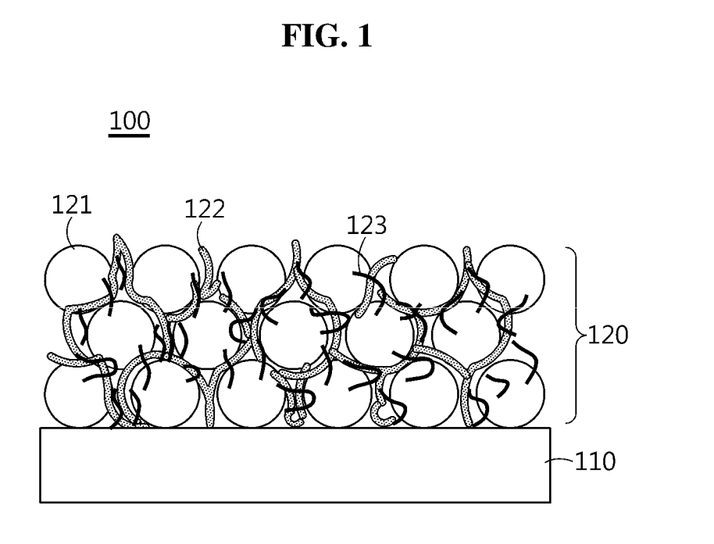
FIG. 1 schematically shows an electrode including electrode active material particles, a polymer-based solid electrolyte and a conductive material according to the related art.

FIG. 1 schematically shows an electrode for an all solid-state battery including a polymer-based solid electrolyte according to the related art. FIG. 1 shows the electrode 100 including an electrode active material layer 120 formed by coating a slurry including electrode active material particles 121, a conductive material 123, a polymer-based solid electrolyte 122 on a current collector 110 and applying the pressure, and due to the poor interfacial contact between the electrode active material particles and the polymer-based solid electrolyte, a battery manufactured using the electrode shows limited capacity. When too much pressure is applied to increase the contact area between the active material particles and the polymer-based solid electrolyte, cracks may occur in the active material particles. By this reason, when the polymer-based solid electrolyte is applied, the electrode does not fully show capacity as much as it does in a liquid electrolyte solution, and the capacity is at lower level than the design or theoretical capacity.

DISCLOSURE

Technical Problem

The present disclosure is designed to solve the above-described problem, and therefore the present disclosure is directed to providing an electrode with improved energy density by improving the capacity and output characteristics of the electrode through improvements in conductivity of lithium ions and ionic conductivity by increasing the contact area between electrode active material particles and a polymer-based solid electrolyte. The present disclosure is further directed to providing a method for manufacturing the electrode having these technical features.

Technical Solution

The present disclosure relates to a method for manufacturing an electrode for an all solid-state battery to solve the above-described technical problem. A first aspect of the present disclosure relates to the method including preparing a first coating layer slurry including electrode active material particles, a first polymer-based solid electrolyte and a conductive material, coating the first coating layer slurry on at least one surface of a current collector to prepare a first preliminary electrode, preparing an electrolyte solution, the electrolyte solution being a liquid mixture of a second polymer-based solid electrolyte and a solvent, impregnating the first preliminary electrode with the electrolyte solution and drying to prepare a second preliminary electrode, and performing a solvent annealing process on the second preliminary electrode to manufacture an electrode, wherein the first polymer-based solid electrolyte corresponding to part of a total amount of the polymer-based solid electrolyte is put into the first coating layer slurry, and the second polymer-based solid electrolyte corresponding to a remaining amount is put into the electrolyte solution.

In the above-described aspect, according to a second aspect of the present disclosure, the polymer-based solid electrolyte is a polymer electrolyte formed by adding polymer resin to a solvated lithium salt.

In any one of the above-described aspects, according to a third aspect of the present disclosure, the solvent annealing process includes putting the preliminary electrode in an airtight space, filling the airtight space with a vaporized solvent, and maintaining the preliminary electrode in the airtight space filled with the vaporized solvent.

In any one of the above-described aspects, according to a fourth aspect of the present disclosure, the solvent annealing process is performed for 1 to 72 hours.

In any one of the above-described aspects, according to a fifth aspect of the present disclosure, the solvent includes at least one of an aprotic solvent selected from N,N-dimethylacetamide (DMAc), N-methyl pyrrolidone (NMP), dimethyl sulfoxide (DMSO) and N,N-dimethylformamide (DMF); and a protic solvent selected from water, methanol, ethanol, propanol, n-butanol, isopropyl alcohol, decalin, acetic acid and glycerol.

In any one of the above-described aspects, according to a sixth aspect of the present disclosure, a volume of the polymer-based solid electrolyte expands by permeation of the vaporized organic solvent.

In any one of the above-described aspects, according to a seventh aspect of the present disclosure, the first polymer-based solid electrolyte and the second polymer-based solid electrolyte are different from each other.

In the seventh aspect, according to an eighth aspect of the present disclosure, the first polymer-based solid electrolyte includes at least one selected from polypropylene carbonate, a polycarbonate-based polymer electrolyte, a polysiloxane-based polymer electrolyte, a phosphazene-based polymer electrolyte and a polyether-based polymer electrolyte.

In any one of the above-described aspects, according to a ninth aspect of the present disclosure, the first coating layer slurry includes at least one of an oxidation stabilizing additive and a reduction stabilizing additive.

In addition, the present disclosure relates to an electrode for an all solid-state battery manufactured by the method according to at least one of the above-described aspects. A tenth aspect of the present disclosure relates to the electrode including electrode active material particles, a first polymer-based solid electrolyte, a second polymer-based solid electrolyte and a conductive material, wherein at least part of surfaces of the electrode active material particles is coated with a first coating layer including a mixture of the first polymer-based solid electrolyte and the conductive material, the second polymer-based solid electrolyte coats at least part of either surfaces of the first coating layer or surfaces of the active material particles or surfaces of both, and the electrode active materials are bonded together in the electrode by at least one of the first polymer-based solid electrolyte and the second polymer-based solid electrolyte to form an integrated structure.

In the tenth aspect, according to an eleventh aspect of the present disclosure, the first and second polymer-based solid electrolytes are derived from a result of performing a solvent annealing process by a vaporized solvent.

In the tenth or eleventh aspect, according to a twelfth aspect of the present disclosure, the first and second polymer-based solid electrolytes include a swellable polymer.

In any one of the tenth to twelfth aspects, according to a thirteenth aspect of the present disclosure, the solvent includes at least one of an aprotic solvent selected N,N-dimethylacetamide (DMAc), N-methyl pyrrolidone (NMP), dimethyl sulfoxide (DMSO) and N,N-dimethylformamide (DMF); and a protic solvent selected from water, methanol, ethanol, propanol, n-butanol, isopropyl alcohol, decalin, acetic acid and glycerol.

In any one of the tenth to thirteenth aspects, according to a fourteenth aspect of the present disclosure, the first polymer-based solid electrolyte and the second polymer-based solid electrolyte are different from each other.

In any one of the tenth to fourteenth aspects, according to a fifteenth aspect of the present disclosure, the first polymer-based solid electrolyte includes at least one selected from polypropylene carbonate, a polycarbonate-based polymer electrolyte, a polysiloxane-based polymer electrolyte, a phosphazene-based polymer electrolyte and a polyether-based polymer electrolyte.

Advantageous Effects

The electrode according to the present disclosure has the increased contact area between the electrode active material particles and the polymer-based solid electrolyte and the increased reaction site of the electrode active material. Additionally, the conductive material is distributed closer to the active material particles, and more frequent contacts are made between the conductive material and the electrode active material particles. Accordingly, mobility of lithium ions increases during charging/discharging, thereby improving the capacity of the electrode.

BRIEF DESCRIPTION OF DRAWINGS

The accompanying drawings illustrate a preferred embodiment of the present disclosure, and together with the above detailed description, serve to provide further understanding of the technical aspects of the present disclosure, and thus, the present disclosure should not be construed as being limited to the drawings. Meanwhile, the shape, size, scale or proportion of the elements in the drawings as used herein may be exaggerated to emphasize clearer description.

BEST MODE

Hereinafter, the embodiments of the present disclosure will be described in detail. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Therefore, the context in the embodiments described herein are just a most preferred embodiment of the present disclosure, but not intended to fully describe the technical aspects of the present disclosure, so it should be understood that other equivalents and modifications could be made thereto at the time the application was filed.

The terms [include(s)] and [comprise(s)] when used in this specification, specify the presence of stated elements, but do not preclude the presence or addition of one or more other elements, unless the context clearly indicates otherwise.

The terms [about] and [substantially] are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

[A and/or B] when used in this specification, specifies [either A or B or both].

The present disclosure relates to a method for manufacturing an electrode for a lithium ion secondary battery and an electrode manufactured by the method. In the present disclosure, the lithium ion secondary battery is an all solid-state battery using a polymer-based solid electrolyte as an electrolyte. In the present disclosure, the all solid-state battery may be referred to as a lithium polymer secondary battery or a lithium ion polymer secondary battery.

In an embodiment of the present disclosure, the electrode includes an electrode active material layer including electrode active material particles, a polymer-based solid electrolyte and a conductive material, in which the polymer-based solid electrolyte fills the voids between the electrode active material particles, and the polymer-based solid electrolyte is in swollen state by permeation of a solvent, thereby increasing the mobility of lithium ions. Additionally, in an embodiment of the present disclosure, the electrode active material layer includes the conductive material interposed between the electrode active material particles to increase electrical conductivity. That is, in a particular embodiment of the present disclosure, the electrode active material layer includes the electrode active material particles held together by point-bonds and/or surface-bonds briefly by the medium of the polymer-based solid electrolyte. Additionally, the conductive material is uniformly distributed in the solid electrolyte. In an embodiment of the present disclosure, the polymer-based solid electrolyte may include a swellable polymer electrolyte, and for example, the polymer-based solid electrolyte may include a swellable polymer electrolyte in an amount of 50% or more, 70% or more, 80% or more, 90% or more, 95% or more or 100% of its total volume. In the specification, the swellable polymer electrolyte includes a polymer material and its volume expands by permeation of an organic solvent. Accordingly, in the electrode according to the present disclosure, the polymer-based solid electrolyte may be expanded (swollen) at a predetermined ratio by permeation of the solvent. When voids between the active material particles are filled with the swollen polymer (polymer electrolyte), the porosity of the electrode active material layer reduces and an area of contact between the polymer electrolyte and the active material particles in the electrode active material layer increases, resulting in improved battery characteristics including reduced resistance and enhanced capacity.

To this end, the polymer-based solid electrolyte according to the present disclosure preferably has a property that swells by solvent annealing. Additionally, the polymer-based solid electrolyte may have a wide potential window to coat the surfaces of the electrode active material particles and/or fill between the electrode active material particles. For example, in the case of the positive electrode, the polymer-based solid electrolyte having good oxidation stability may be used, and in the case of the negative electrode, the polymer-based solid electrolyte having good reduction stability may be used. For example, from the perspective of oxidation stability, the electrolyte may include a polycarbonate-based polymer electrolyte, a polysiloxane-based polymer electrolyte and a phosphazene-based polymer electrolyte, and from the perspective of reduction stability, the electrolyte may include a polyether-based polymer electrolyte.

In an embodiment of the present disclosure, through the solvent annealing process, the polymer-based solid electrolyte may swell at a ratio of more than 1 vol % and 1,000 vol % or less and its volume may increase, and the polymer-based solid electrolyte may swell 50 vol % or more, 100 vol % or more, 200 vol % or more, 300 vol % or more, 400 vol % or more, 500 vol % or more, 600 vol % or more, 700 vol % or more or 800 vol % or more within the above-described range. When the degree of swelling of the polymer-based solid electrolyte used is less than the above-described range, the improvement effect of interfacial contact between the active material and the electrolyte is low, and when the polymer-based solid electrolyte swells at much higher level than the above-described range, the electrode becomes too thick, resulting in low energy density. The degree of swelling of the polymer-based solid electrolyte may be affected by the molecular weight and/or the degree of crosslinking of the polymer material, and as the molecular weight is smaller and the degree of crosslinking is lower or closer to zero, the polymer-based solid electrolyte swells better.

In general, "swelling" refers to a phenomenon in which a material absorbs a solvent and its volume expands. The "degree of swelling" as used herein indicates a volume increase in percentage calculated from the measured volumes of the polymer-based solid electrolyte before solvent annealing (initial volume) and after solvent annealing, and may be represented by the following Equation 1). For example, 100% degree of swelling of the polymer-based solid electrolyte refers to volume expansion twice larger than the volume before solvent annealing. In the present disclosure, the solvent annealing refers to the permeation of the vaporized organic solvent into the electrolyte by the exposure of the polymer-based solid electrolyte to the vaporized organic solvent for a predetermined time, the exposure takes place in an airtight space saturated with a vapor of the organic solvent, the exposure time may be controlled within the range of 1 to 72 hours, and the temperature condition may be controlled within the range of 20° C. to 150° C. In an embodiment of the present disclosure, within the above-described range, the temperature may be 30° C. or above, 40° C. or above, 50° C. or above, 60° C. or above, 70° C. or above, 80° C. or above, or 90° C. or above, or the temperature may be 140° C. or less, 130° C. or less, 120° C. or less, 100° C. or less or 80° C. or less.

Equation 1)

Degree of swelling (%)={(Initial volume of polymer-based solid electrolyte—Volume of polymer-based solid electrolyte after solvent annealing)/Initial volume of polymer-based solid electrolyte}X100

For example, the polymer-based solid electrolyte may be selected from those having the degree of swelling within the above-described range according to Equation 1 when exposed in saturated NMP vapor atmosphere at the temperature condition of 30° C. for 24 hours. Alternatively, the above Equation 1 may be used to set the solvent annealing condition (solvent, temperature and/or exposure time) for imparting the above-described range of degree of swelling to the selected polymer-based solid electrolyte.

As described below, the electrode for an all solid-state battery according to the present disclosure goes through a solvent annealing process after a preliminary electrode is manufactured. In this instance, the polymer-based solid electrolyte swells by permeation of the vaporized solvent, and accordingly, the finally obtained electrode has lower porosity than the preliminary electrode. In a particular embodiment of the present disclosure, a porosity difference between the electrode active material layer of the finally obtained electrode for an all solid-state battery and the electrode active material layer of the preliminary electrode may be 0.5% or more, 1% or more, or 5% or more. Additionally, the height of the finally obtained electrode for an all solid-state battery may be larger than that of the preliminary electrode by the swelling.

In an embodiment of the present disclosure, the polymer-based solid electrolyte may include those having ionic conductivity suitable to transport lithium ions in the electrode, for example or $10^{-7}$ s/cm or more, $10^{-5}$ s/cm or more or $10^{-4}$ s/cm or more.

In an embodiment of the present disclosure, the ionic conductivity may be determined by measuring the electrochemical impedance of the electrolyte material using a measuring instrument such as VMP3 (Bio logic science instrument) and applying a Nyquist plot to the measurement result.

In a particular embodiment of the present disclosure, one or more polymer-based solid electrolytes may be appropriately used to improve the characteristics of the electrode and the characteristics of the electrode active material particles.

In the present disclosure, the above-described polymer-based solid electrolyte may be a polymer electrolyte formed by adding polymer resin to a solvated lithium salt.

For example, the polymer electrolyte may include at least one selected from the group consisting of polyether-based polymer, polycarbonate-based polymer, acrylate-based polymer, polysiloxane-based polymer, phosphazene-based polymer, polyethylene derivatives, alkylene oxide derivatives such as poly ethylene oxide (PEO), phosphoric acid ester polymer, poly agitation lysine, polyester sulfide, polyvinyl alcohol, polyvinylidene fluoride and polymer containing ionic dissociation groups, but is not limited thereto.

In a particular embodiment of the present disclosure, the polymer electrolyte is polymer resin, and may include at least one selected from the group consisting of poly ethylene oxide (PEO), branched copolymer made by copolymerization of comonomers of amorphous polymer such as PMMA, polycarbonate, polysiloxane (pdms) and/or phosphazene into the main chain of PEO, comb-like polymer resin and cross-linked polymer resin.

In the electrolyte of the present disclosure, the above-described lithium salt is an ionizable lithium salt that may be represented by $Li^+EX^-$. The anion X of the lithium salt is not limited to a particular type, but may include, for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

According to an embodiment of the present disclosure, the electrode active material layer may include 1 to 100 parts by weight of the polymer-based solid electrolyte based on 100 parts by weight of the electrode active material. Within the above-described range, the polymer-based solid electrolyte may be present in an amount of 2 parts by weight or more, 10 parts by weight or more, 20 parts by weight or more, 30 parts by weight or more, 50 parts by weight or more, or 70 parts by weight or more. Within the above-described range, the polymer-based solid electrolyte may be present in an amount of 95 parts by weight or less, 90 parts by weight or less, 80 parts by weight or less, 70 parts by weight or less, 60 parts by weight or less, 50 parts by weight or less, 40 parts by weight or less, 30 parts by weight or less. When the amount of the polymer-based solid electrolyte is more than the upper limit, the proportion of the active material in the electrode is low and the energy density may reduce, and when the amount of the polymer-based solid electrolyte is less than the lower limit, the ionic conductivity in the electrode reduces and the capacity is low.

In the present disclosure, the conductive material may include, without limitation, any type that has conductivity while not causing a chemical change to the corresponding battery, for example, at least one selected from graphite including natural graphite or artificial graphite; carbon black including carbon black, acetylene black, ketjen black, channel black, furnace black, lamp black and thermal black; conductive fibers including carbon fibers such as vapor grown carbon fiber (VGCF) or metal fibers; metal powder including fluorocarbon, aluminum and nickel powder; conductive whiskers including zinc oxide and potassium titanate; conductive metal oxide including titanium oxide; conductive materials including polyphenylene derivatives.

According to an embodiment of the present disclosure, the electrode active material layer may include the conductive material within the range of 0 to 30 weight % based on 100 weight % of the electrode active material layer. According to a particular embodiment of the present disclosure, within the above-described range, the conductive material may be present in an amount of 0.5 weight % or more, 1 weight % or more or 3 weight % or more or 5 weight % or more, and 15 weight % or less, 10 weight % or less, 7 weight % or less, or 5 weight % or less. For example, the conductive material may be present in an amount of 0.5 to 5 weight % based on 100 weight % of the electrode active material layer. When the conductive material is present in a higher amount than the upper limit, the proportion of the active material is low and the energy density reduces, and when the conductive material is present in a lower amount than the lower limit, the electron conductivity does not reach a desired level and the capacity reduces.

In the present disclosure, the electrode may be any one of a negative electrode and a positive electrode. When the electrode is a negative electrode, the electrode active material may include, without limitation, any type that can be used as a negative electrode active material of a lithium ion secondary battery. For example, the negative electrode active material may include at least one selected from carbon such as non-graphitizable carbon and graphite-based carbon; metal composite oxide such as $Li_xFe_2O_3(0 \leq x \leq 1)$, $Li_xWO_2(0 \leq x \leq 1)$, $Sn_xMe_{1-x}Me'_yO_z$(Me:Mn, Fe, Pb, Ge; Me': Al, B, P, Si, elements of Groups 1, 2 and 3 in the periodic table, halogen; $0 \leq x \leq 1$; $1 \leq y \leq 3$; $1 \leq z \leq 8$); lithium metal; lithium alloys; silicon-based alloys; tin-based alloys; metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ and $Bi_2O_5$; conductive polymer such as polyacetylene; Li—Co—Ni based materials; titanium oxide; and lithium titanium oxide. In a particular embodiment, the negative electrode active material may include a carbon based material and/or Si.

When the electrode is a positive electrode, the electrode active material may include, without limitation, any type that can be used as a positive electrode active material of a lithium ion secondary battery. For example, the positive electrode active material may include layered compounds such as lithium cobalt oxide ($LiCoO_2$) and lithium nickel oxide ($LiNiO_2$), or compounds with one or more transition metal substitution $(Li_{1+a}[Ni_xMn_yCo_{(1-x-y)}]M_zO_2$ where $0 \leq a \leq 0.2$, $0.4 \leq x \leq 0.9$, $0 < x \pm y < 1$, M is at least one selected from the group consisting of Co, Mn, Ni, Al, Fe, V, Cr, Ti, Ta, Mg, Mo, Zr, W, Sn, Hf, Nd and Gd, $0 \leq z \leq 0.1$); lithium manganese oxide such as formula $Li_{1+x}Mn_{2-x}O_4(x=0\sim0.33)$, $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$, $Cu_2V_2O_7$; Ni site lithium nickel oxide represented by chemical formula $LiNi_{1-x}M_xO_2$(M=Co, Mn, Al, Cu, Fe, Mg, B or Ga, $x=0.01\sim0.3$); lithium manganese composite oxide represented by chemical formula $LiMn_{2-x}M_xO_2$(M=Co, Ni, Fe, Cr, Zn or Ta, $x=0.01\sim0.1$) or $Li_2Mn_3MO_8$ (M=Fe, Co, Ni, Cu or Zn); lithium manganese composite oxide of spinel structure represented by $LiNi_xMn_{2-x}O_4$; $LiMn_2O_4$ with partial substitution of alkali earth metal ion for Li in chemical formula; disulfide compounds; and $Fe_2(MoO_4)_3$. However, the positive electrode active material is not limited thereto.

In an embodiment of the present disclosure, the positive and/or negative electrode active material may have the particle diameter of about 0.01 μm to 50 μm, and may be in the form of secondary particles or aggregates created by agglomeration of particles.

The electrode active material layer may be formed on at least one surface of a current collector. Additionally, the electrode may further include a binder resin if necessary.

In the present disclosure, the binder resin may include, without limitation, any type that aids the bonding between the active material and the conductive material and bonding between the active material and the current collector, for example, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene rubber, fluorine rubber and a variety of copolymers. In general, the binder resin may be present in an amount of 1 to 30 weight % or 1 to 10 weight % based on 100 weight % of the electrode layer.

In an embodiment of the present disclosure, the electrode may further include various additives with an aim of adding or improving the physical and chemical properties of the electrode. The additive is not limited to a particular type, and may include at least one of an oxidation stabilizing additive, a reduction stabilizing additive, a retardant, a heat stabilizer and an antifogging agent. An example of the oxidation stabilizing additive may be succinonitrile.

In the present disclosure, the current collector may include those having electrical conductivity, for example, a metal plate, well known in the field of secondary batteries and suitable according to the polarity of the electrode. Additionally, the thickness of the current collector may be appropriately adjusted approximately within the range of 1 μm to 50 μm.

In a particular embodiment of the present disclosure, the porosity of the finally obtained electrode active material layer may be appropriately selected from the range of 0 to 18%. In an embodiment of the present disclosure, the porosity may be 1% or more, 3% or more, 5% or more, 7% or more, 10% or more, 15% or more, or 17% or more, and may be 18% or less, 15% or less, 10% or less, 7% or less or 5% or less, and for example, the porosity may be 1 to 15% or 5 to 18%. The term "porosity" refers to a fraction of the volume occupied by pores in a structure over the total volume and is indicated in %, and may be interchangeably used with void fraction. In the present disclosure, the measurement of the porosity is not particularly limited, and according to an embodiment of the present disclosure, for example, the porosity may be measured by Brunauer-Emmett-Teller (BET) measurement technique using nitrogen gas or Hg porosimeter. Alternatively, in an embodiment of the present disclosure, after calculating the net density of the electrode active material layer from the density (apparent density) of the obtained electrode (the electrode active material layer) and a composition ratio and the density of each component included in the electrode (the electrode active material layer), the porosity of the electrode active material layer may be calculated from a difference between the apparent density and the net density.

Subsequently, a method for manufacturing the electrode having the above-described feature will be described. The manufacturing method as described below is one of various methods that may be used to manufacture the electrode according to the present disclosure, and is not limited thereto.

First, a slurry for manufacturing an electrode active material layer including electrode active material particles, a polymer-based solid electrolyte and a conductive material is prepared (S1).

To this end, a mixture of a polymer-based solid electrolyte and a conductive material is prepared. First, the polymer-based solid electrolyte may be provided in the form of a melted blend prepared by melting polymer resin and a lithium salt at high temperature or a solution containing polymer resin and a lithium salt uniformly dispersed in an organic solvent. Subsequently, a conductive material may be added and mixed with the blend or the solution to prepare a mixture. The mixture may further include a binder resin if necessary. Electrode active material particles may be added thereto and mixed to prepare an electrode active material layer-forming slurry. For the amount of the electrode active material and the polymer-based solid electrolyte in the slurry, a reference may be made to the foregoing description.

However, the method of preparing the slurry described above is provided for illustration purposes only, but not limited to the foregoing description. Particularly, changes may be made to the order of putting or mixing the slurry components, considering the physical and chemical properties of the input components and the intended electrode or battery characteristics. For example, the polymer-based solid electrolyte, the conductive material and the electrode active material may be put into a dispersion medium such as a solvent at different times, or in another embodiment, at the same time.

Subsequently, the slurry is coated on at least one surface of the current collector to manufacture a preliminary electrode (S2). In the specification, the preliminary electrode is an electrode without solvent annealing.

The coating is performed by applying the slurry on at least one surface of the current collector and drying. The coating may use a common slurry coating method, for example, doctor blade or slot die coating.

Meanwhile, in an embodiment of the present disclosure, before performing the subsequent pressing process, the method may further include impregnating the preliminary electrode with a solid electrolyte solution (process a). In the present disclosure, the solid electrolyte solution may be a liquid mixture or a suspension of a polymer-based solid electrolyte and a solvent. When the process a is performed as described above, part of the total expected amount of solid electrolyte may be mixed with the conductive material and the electrode active material in the step (S1), and the remaining amount may be used in the process a. In this case, in the process a, 1 weight % to 99 weight % of the solid electrolyte may be used based on 100 weight % of the total solid electrolyte used, and for example, 5 weight % to 70 weight % or 10 to 50 weight % of the solid electrolyte may be used.

As described above, when a two-step coating process is performed by splitting an amount of solid electrolyte used into two divisions, the electrode according to the present disclosure includes electrode active material particles, a first polymer-based solid electrolyte, a second polymer-based solid electrolyte and a conductive material, wherein at least part of the surfaces of the electrode active material particles is coated with a first coating layer including a mixture of the first polymer-based solid electrolyte and the conductive material, and the second polymer-based solid electrolyte coats at least part of either the surfaces of the first coating layer or the surfaces of the active material particles or the surfaces of both. Additionally, the electrode active materials are bonded together in the electrode by at least one of the first polymer-based solid electrolyte and the second polymer-based solid electrolyte to form an integrated structure. Here, the first and second polymer-based solid electrolytes are distinguished according to the step in which they are introduced, and may be the same or different substances.

Polyethylene oxide (PEO) is one of typical polymer solid electrolytes, and it is easy to produce and has better ionic conductivity and mechanical properties than other polymer-based solid electrolytes. However, low oxidation stability limits the use of high potential positive electrode materials. Accordingly, when manufacturing the positive electrode, the first coating layer may include a polymer electrolyte material having high oxidation stability, for example, at least one selected from a polypropylene carbonate, a polycarbonate-based polymer electrolyte, a polysiloxane-based polymer electrolyte and a phosphazene-based polymer electrolyte. In the case of the negative electrode, from the perspective of reduction stability, the first coating layer may include a polyether-based polymer electrolyte. Together with or apart from the above-described electrolyte material, in the case of the positive electrode, the first coating layer may include an oxidation stabilizing additive to improve the oxidation stability, and in the case of the negative electrode, the first coating layer may include a reduction stabilizing additive to improve the reduction stability, in order to stabilize the interfacial reaction between the positive electrode active material and the solid electrolyte. Additionally, the second coating layer electrolyte material may include a common polymer-based solid electrolyte such as a PEO-based polymer electrolyte to improve the performance. The oxidation stabilizing additive is a material that assists in preventing the degradation caused by too much oxidation of the positive electrode, and for example, may be likely to oxidation earlier at low potential than the positive electrode active material. Meanwhile, the reduction stabilizing additive is a material that assists in preventing the degradation caused by too much reduction of the negative electrode, and for example, may be likely to reduction at high potential than the negative electrode active material.

Additionally, due to this structural feature, the electrode has the following advantage. As the total expected amount of the conductive material is used in the step (S1), the conductive material is included in the first coating layer and distributed very close to the electrode active material, thereby minimizing the distance between the conductive material and the electrode active material and making more frequent contact with the electrode active material. Accordingly, there is a low probability that the conductive material is isolated in an unreacted region, and the use of the conductive material even in a small amount achieves good electrical conductivity, thereby reducing an amount of the conductive material used. Additionally, the effective placement of the conductive material improves the electrical conductivity, and thus there is no need to perform electrode rolling in extreme pressure conditions to reduce the electrode porosity and increase the contact area between the electrode and polymer electrolyte during the electrode rolling.

Additionally, when the process a follows the step S1, the polymer electrolyte is filled between the electrode active materials, the resistance between the electrode active material and the polymer electrolyte reduces and the electrochemical reaction area increases, resulting in improved battery performance including improved lithium ion mobility.

Subsequently, the preliminary electrode obtained in the above-described step is dried, and if necessary, a pressing process is performed. The pressing process includes packing the constituent materials so that the electrode (the electrode active material layer) has an appropriate porosity, and is not limited to a particular method. For example, common pressing methods such as hot press or rolling may be appropriately selected and performed, and if necessary, the temperature condition may be appropriately controlled by heating or cooling.

Subsequently, a solvent annealing process is performed on the preliminary electrode (S4). In the solvent annealing, the polymer-based solid electrolyte is exposed to a vaporized organic solvent, and the vaporized solvent permeates the solid electrolyte and thus the volume of the electrolyte expands. The solvent annealing process may include putting the electrode into an airtight space (for example, a chamber); filling the airtight space with a vaporized solvent; and maintaining the electrode in the airtight space filled with the vaporized solvent for a predetermined time.

In the maintaining step, the vaporized solvent permeates the polymer-based solid electrolyte of the electrode, and the polymer-based solid electrolyte swells. In a particular embodiment of the present disclosure, the filling of the airtight space may be performed by vaporizing a solvent in a separate space connected to the chamber through a tube and injecting the vaporized solvent into the chamber. Alternatively, the filling of the airtight space may be performed by putting a liquid solvent in a separately prepared container, placing it in the chamber and directly vaporizing the solvent in the chamber by heating the chamber. In this instance, it is desirable to place the liquid solvent and the electrode spaced apart from each other to avoid a direct contact between.

Meanwhile, the step of putting the electrode in the airtight space (for example, a chamber) and the step of filling the airtight space with the vaporized solvent may be performed in reverse order if necessary. For example, before putting the electrode into the chamber, the chamber may be filled with the vaporized solvent. That is, in an embodiment of the present disclosure, the vaporization may be performed in the temperature range of about 15° C. to 200° C., considering the vapor pressure or boiling point of the solvent. For example, the vaporization may be performed in the room temperature condition of about 20° C. to 30° C., or the vaporization may be performed in a higher temperature condition by heating, for example, the temperature condition of about 200° C. or less. That is, in an embodiment of the present disclosure, the temperature of the vaporized solvent may be about 15° C. to 200° C., and solvent annealing may be performed in the chamber filled with the vaporized solvent within the temperature range for a predetermined time.

In an embodiment of the present disclosure, the airtight space in which solvent annealing is performed, for example, the chamber, needs to be saturated with the vaporized solvent. To this end, the airtight space is maintained above the vapor pressure of the solvent. In an embodiment of the present disclosure, the vaporized solvent is continuously injected until the solvent annealing ends, or when a liquid solvent is put into the chamber together with the vaporized solvent and heated, the solvents are present in an excessive amount so that all the solvents do not vaporize until the solvent annealing process is completed and the residual solvent is left. The amount of the solvent used may be determined considering the quantity (volume or weight) of the polymer-based solid electrolyte used in the electrode and/or the size of the chamber. For example, when NMP is used as the solvent, the chamber is about 300 ml in size, and when solvent annealing is performed at 130° C. for 24 hours, about 3000 of NMP may be used.

In a particular embodiment of the present disclosure, the solvent used in the solvent annealing may include, without limitation, any type that is chemically stable without causing degradation to the electrode when applied to the electrode. For example, the solvent may be selected from solvents that can be used as an electrolyte solution for an electrochemical device, and for example, the solvent may include at least one selected from cyclic, linear or branched carbonate, linear ester and ether. Its non-limiting example may include propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, dimethoxyethane, diethoxyethane, tetrahydrofuran, N-methyl-2-pyrrolidone (NMP), ethyl methyl carbonate (EMC), vinylene carbonate (VC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate and butyl propionate.

Additionally, the solvent may include at least one of an aprotic solvent selected from N,N-dimethylacetamide (DMAc), N-methyl pyrrolidone (NMP), dimethyl sulfoxide (DMSO) and N,N-dimethylformamide (DMF), THF, acetonitrile, benzene, butyl acetate, chloroform, cyclo hexane, 1,2-dichloroethane, ethyl acetate, diethyl ether, hexane, heptane, pentane, xylene and toluene; and a protic solvent selected from water, methanol, ethanol, propanol, n-butanol, isopropyl alcohol, decalin, acetic acid and glycerol.

Additionally, the time for solvent annealing may range from 1 to 72 hours and the time may be controlled within an appropriate range. For example, within the above-described range, the time may be 2 hours or more, 10 hours or more, 20 hours or more, 30 hours or more, or 50 hours or more, or within the above-described range, the time may be 65 hours or less, 60 hours or less, 50 hours or less, 40 hours or less, or 30 hours or less. When the annealing temperature and pressure is within the above-described range, solvent annealing by solvent volatilization may be efficiently performed. Additionally, when the annealing time is longer than the above-described time, the electrode process time increases and productivity reduces, and when the annealing time is shorter than the above-described time, the polymer-based solid electrolyte that constitutes the electrode may not uniformly swell.

Meanwhile, in an embodiment of the present disclosure, after the solvent annealing is completed, an additional pressing process may be performed to adjust the porosity.

In the electrode obtained through the above-described method, the polymer-based solid electrolyte in swollen state by the permeation of the solvent is filled in the electrode active material layer, and hence the active material particles are bonded to the polymer-based solid electrolyte and the conductive material into close surface contact and point contact, forming an integrated electrode structure.

The electrode obtained through the above-described method may be provided for an electrode assembly for an all solid-state battery and/or a process of manufacturing an all solid-state battery, and in this instance, the solid electrolyte swollen by annealing is preferably input in the subsequent process.

FIG. 1 schematically shows the electrode manufactured by an electrode manufacturing method according to the related art. The electrode manufacturing method according to the related art includes mixing active material particles, a polymer-based solid electrolyte and a conductive material all at once to prepare an electrode slurry and coating the electrode slurry on a current collector. In this case, due to insufficient contact between the electrode active material and the solid electrolyte and their small contact area, the electrochemical reaction site between the electrode active material and the solid electrolyte is not enough, resulting in poor battery performance including reduced capacity, reduced output characteristics, reduced ionic conductivity and increased interfacial resistance. To solve these problems, electrode coating is followed by a rolling process of rolling the electrode surface under high pressure condition to increase the contact area between the electrode active material and the polymer-based solid electrolyte. However, the active material is cracked or broken by high pressure applied in the pressing process, resulting in reduced battery capacity or life characteristics.

Figure 2:
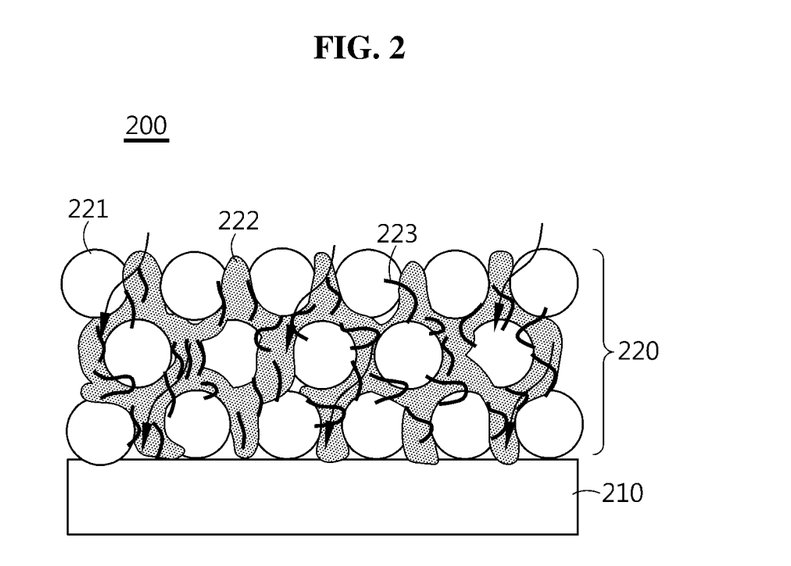
FIG. 2 schematically shows the permeation of a solvent vapor into an electrode including electrode active material particles, a polymer-based solid electrolyte and a conductive material according to an embodiment of the present disclosure.
Figure 3:
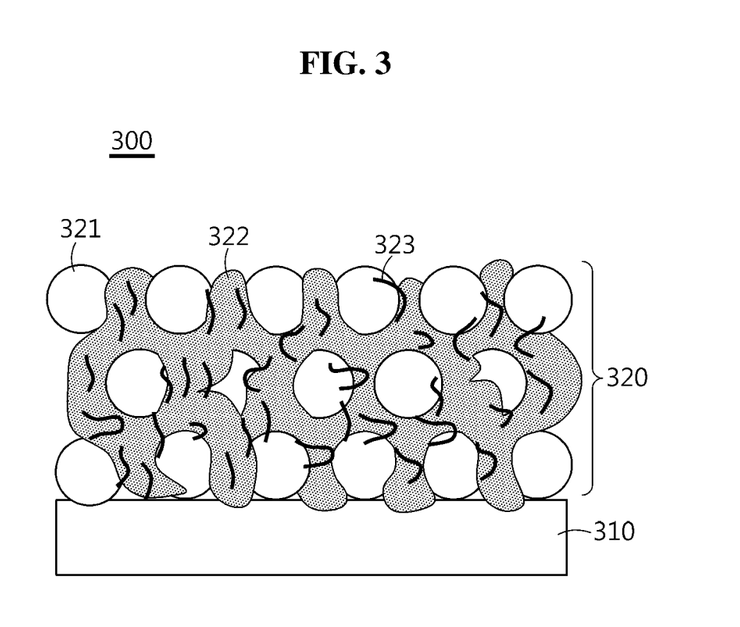
FIG. 3 schematically shows an electrode including electrode active material particles, a polymer-based solid electrolyte and a conductive material according to an embodiment of the present disclosure.

FIGS. 2 and 3 schematically show the electrode according to an embodiment of the present disclosure. Referring to FIGS. 2 and 3, electrode active material layers 220, 320 are formed on one surface of current collectors 210, 310, and uniform swelling of all polymer solid electrolytes 222, 322 within the electrode active material layers 220, 320 induced by a solvent vapor (arrow, FIG. 2) permeated during a solvent annealing process brings the electrode active material and the electrolyte into close contact, and the area of the electrochemical reaction site increases. Additionally, conductive materials 223, 323 are disposed closer to the surfaces of the electrode active material particles 221, 321, and a larger amount of conductive materials 223, 323 participate in the electrochemical reaction, thereby reducing an amount of the conductive material used. Additionally, even though extreme pressure is not applied during electrode rolling, the solid electrolyte and the electrode active material are brought into close contact and sufficient electrochemical reaction site is provided, thereby preventing the electrode degradation caused by the applied pressure. In addition, the lithium ion mobility increases and the capacity of the active material increases.

Figure 4:
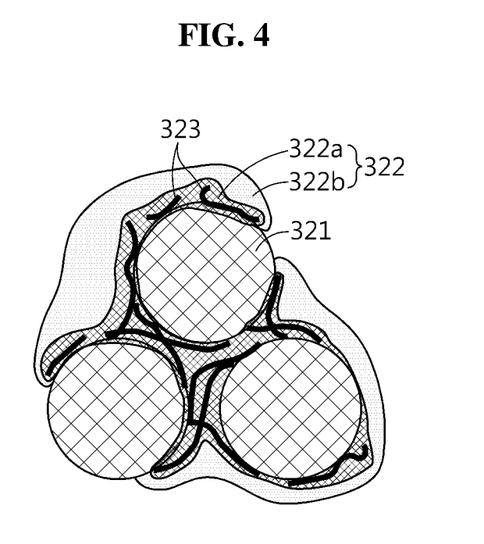
FIG. 4 is a partial enlarged view of an electrode according to an embodiment of the present disclosure.

FIG. 4 is a partial enlarged diagram of the electrode according to an embodiment of the present disclosure, where a two-step coating process is performed by splitting an amount of solid electrolyte used, and the electrode includes electrode active material particles, a first polymer-based solid electrolyte, a second polymer-based solid electrolyte and a conductive material, wherein at least part of the surfaces of the electrode active material particles is coated with a first coating layer including a mixture of the first polymer-based solid electrolyte and the conductive material, and the second polymer-based solid electrolyte coats at least part of either the surfaces of the first coating layer or the surfaces of the active material particles or the surfaces of both. Additionally, the electrode active materials may be bonded together in the electrode by at least one of the first polymer-based solid electrolyte and the second polymer-based solid electrolyte to form an integrated structure.

The present disclosure further provides a lithium ion secondary battery including at least one electrode. The battery includes a positive electrode, a negative electrode and a solid electrolyte membrane interposed between the positive electrode and the negative electrode, and at least one of the negative electrode and the positive electrode may be in accordance with the present disclosure and have the above-described features.

In the present disclosure, the solid electrolyte membrane is interposed between the negative electrode and the positive electrode, and serves to electrically insulate the negative electrode and the positive electrode, and at the same time, allow lithium ions to pass through. The solid electrolyte membrane may include any type of solid electrolyte membrane commonly used in the field of all solid-state batteries and is not limited to a particular type. In a particular embodiment of the present disclosure, the solid electrolyte membrane is prepared in the shape of a film or a membrane, and may be a free-standing type that is interposed between the electrodes, or a membrane or film type that is coated on the electrode.

In an embodiment of the present disclosure, the solid electrolyte membrane may include at least one of the solid electrolyte substances used in the electrode according to the present disclosure. Apart from or together with the above-described polymer solid electrolyte substance, the solid electrolyte membrane may include an inorganic solid electrolyte substance. The inorganic solid electrolyte is at least one selected from a sulfide-based solid electrolyte and an oxide-based solid electrolyte, and may include, without limitation, any type of substance that is commonly used as a solid electrolyte for an all solid-state battery.

The present disclosure further provides a battery module including the secondary battery as a unit battery, a battery pack including the battery module, and a device including the battery pack as a source of power.

In this instance, specific examples of the device may include, but not limited to, power tools that operate with power from an electric motor; electric vehicles including Electric Vehicles (EVs), Hybrid Electric Vehicles (HEVs) and Plug-in Hybrid Electric Vehicles (PHEVs); electric two wheelers including E-bikes and E-scooters; electric golf carts; and ESS s.

Hereinafter, the present disclosure is described in detail through examples, but the following examples are provided for illustration only and the scope of the present disclosure is not limited thereto.

Example: Manufacture of Electrode and Battery

Example 1

(1) Manufacture of Electrode

First, a preliminary electrode having a first coating layer on the surface of an electrode active material is manufactured. NCM811($LiNi_{0.8}Co_{0.1}Mn_{0.1}O_2$) as an electrode active material, a vapor grown carbon fiber (VGCF) as a conductive material and a polymer-based solid electrolyte (a mixture of PEO and LiTFSI($CF_3SO_2NLiSO_2CF_3$), a mole ratio of PEO:LiTFSI=9:1) are mixed at a weight ratio of 89.9:3.4:6.7, put into acetonitrile, and stirred to prepare an electrode slurry. An aluminum current collector (20 μm in thickness) is prepared, the slurry is coated on the current collector using doctor blade, and the result is dried under vacuum at 120° C. for 4 hours. A rolling process is performed using a roll press to obtain a preliminary electrode with 2 mAh/cm² electrode loading and 40% porosity. Subsequently, a solid electrolyte (PEO+LiTFSI, 9:1 mole ratio) is put into acetonitrile to prepare a polymer solution and the obtained preliminary electrode is impregnated with the polymer solution. The result is dried under vacuum at 120° C. for 4 hours. The porosity of the obtained electrode is 20%. Subsequently, the electrode is put into a chamber (300 ml), and 300 μl of n-methyl pyrrolidone (NMP) is put into the chamber together, avoiding direct contact with the electrode. The chamber is closed and solvent annealing is performed at 60° C. for 24 hours. Accordingly, an electrode having an electrode active material layer of 15% porosity in the final electrode is manufactured. The porosity refers to a fraction of the volume (pore volume) occupied by pores over the total volume, and is calculated using pore volume obtained by calculating the apparent density calculated from the volume and mass of each electrode active material layer and the net density calculated from the composition ratio of the components used and the density of each component. Meanwhile, an amount of electrolyte used to form the first coating layer in example 1 is 40 weight % of the total amount of the electrolyte used.

(2) Manufacture of Battery

The electrode manufactured as described above is punched into a round shape of 1.4875 cm². A lithium metal thin film is cut into a round shape of 1.7671 cm² to prepare a counter electrode. A 50 μm thick solid electrolyte membrane of a mixture of PEO and LiFTSI ([EO]:[Li]=9:1 mole ratio) is interposed between the two electrodes to manufacture a coin half-cell.

Example 2

An electrode and a battery are manufactured by the same method as example 1 except that a first coating layer is formed using an electrode active material NCM811 ($LiNi_{0.8}Co_{0.1}Mn_{0.1}O_2$), a conductive material VGCF (Vapor grown carbon fiber) and a polymer-based solid electrolyte (a mixture of PEO and LiTFSI($CF_3SO_2NLiSO_2CF_3$), [EO]:[Li]=9:1 mole ratio) at 91:2:7. The porosity of the obtained electrode is 20%.

Example 3

An electrode and a battery are manufactured by the same method as example 1 except that a first coating layer is formed using an electrode active material NCM811 ($LiNi_{0.8}Co_{0.1}Mn_{0.1}O_2$), a conductive material VGCF (Vapor grown carbon fiber) and a polymer-based solid electrolyte (a mixture of polyproplyene carbonate (PPC) and LiTFSI ($CF_3SO_2NLiSO_2CF_3$), [PC]:[Li]=9:1 mole ratio) at 91:2:7. The porosity of the obtained electrode is 20%.

Example 4

An electrode and a battery are manufactured by the same method as example 1 except that a first coating layer is formed using an electrode active material NCM811 ($LiNi_{0.8}Co_{0.1}Mn_{0.1}O_2$), a conductive material VGCF (Vapor grown carbon fiber), a polymer-based solid electrolyte (a mixture of PEO and LiTFSI($CF_3SO_2NLiSO_2CF_3$), [EO]:[Li]=9:1 mole ratio) and succinonitrile at 91:2:6.5:0.5. The porosity of the obtained electrode is 20%.

Comparative Example 1

An electrode active material NCM811 ($LiNi_{0.8}Co_{0.1}Mn_{0.1}O_2$), a conductive material VGCF (Vapor grown carbon fiber) and a polymer-based solid electrolyte (a mixture of PEO and LiTFSI($CF_3SO_2NLiSO_2CF_3$), [EO]:[Li]=9:1, mole ratio) are mixed at a weight ratio of 89.9:3.4:6.7, put into acetonitrile and stirred to prepare an electrode slurry. An aluminum current collector (20 μm in thickness) is prepared, the slurry is coated on the current collector using doctor blade, and the result is dried under vacuum at 120° C. for 4 hours. A rolling process is performed using a roll press to obtain an electrode with 2 mAh/cm² electrode loading and 22% porosity.

Comparative Example 2

An electrode obtained by the same method as comparative example 1 is prepared. Subsequently, the electrode is put into a chamber (300 ml), and 300 µl of NMP is put into the chamber together, avoiding direct contact with the electrode. The chamber is closed and solvent annealing is performed at 60° C. for 24 hours. Accordingly, an electrode having an electrode active material layer of 15% porosity in the final electrode is manufactured.

Experiment 1. Evaluation of Electrical Resistance of Active Material Layer in Electrode The electrical resistance of the electrodes of examples 1 to 2 and comparative examples 1 to 2 is measured using an MP tester and compared, and the results are summarized in the following [Table 1].

TABLE 1

|  | Electrical resistance of active material layer (ohm*cm) |
| --- | --- |
| Example 1 | 12.7 |
| Example 2 | 20.1 |
| Comparative example 1 | 20.8 |
| Comparative example 2 | 21.1 |

From the above results, it can be seen that in the case of example 1 using the same level of conductive material as comparative examples 1 and 2, the conductive material is effectively distributed around the active material in the positive electrode, resulting in the reduced electrical resistance of the active material layer. Example 2 using the conductive material reduced to 2 wt % shows the same level of electrical resistance as comparative example, and thus it can be seen that it is possible to develop electrodes with high capacity by increasing the amount of active material.

Experiment 2. Evaluation of Initial Discharge Capacity and Continuous Charge

The initial discharge capacity is evaluated by charging and discharging the batteries of examples 1 to 2 and comparative examples 1 to 2 in 60° C. condition.

Charge condition: constant current (CC)/constant voltage (CV), (4.25V, 0.005C current cut-off)

Discharge condition: constant current (CC) condition 3V

The capacity retention is derived by calculating a ratio of discharge capacity after cycles to first discharge capacity. The results are summarized in the following [Table 2].

Meanwhile, the side reaction time in the electrode is evaluated by continuously charging the batteries of examples and comparative examples 1 to 2. The evaluation is conducted by charging at 0.05C up to 4.25V in CC mode at 60° C., and after that, continuously applying the current in CV condition. The current improvement time (a point in time at which the current increases during CV mode charge range) resulting from the side reaction in the manufactured battery is determined and summarized in the following [Table 2].

TABLE 2

|  | Discharge capacity (mA/g, 4.25 V) | Current improvement time (hr) (Continuous charge, 4.25 V) |
| --- | --- | --- |
| Example 1 | 185 | 80 |
| Example 2 | 183 | 75 |
| Example 3 | 180 | 110 |
| Example 4 | 181 | 103 |
| Comparative example 1 | 176 | 89 |
| Comparative example 2 | 182 | 81 |

As described above, in examples 1 and 2, the polymer electrolyte in the electrode active material layer swells by the solvent annealing process, and accordingly, the contact area between the active material and the solid electrolyte in the electrode increases, promoting the intercalation and deintercalation of ions into/from the active material. As a result, the capacity and output characteristics are improved compared to comparative examples. Especially, in the case of examples 3 and 4 including solvent annealing after coating the solid electrolyte PPC that is favorable for high voltage on the active material surface, the contact area between the active material and the solid electrolyte in the electrode increases and much reactions at high voltage of 4.25V occur, resulting in improved stability compared to comparative examples.

What is claimed is:

1. An electrode for an all solid-state battery, the electrode comprising:
electrode active material particles, a first polymer-based solid electrolyte, a second polymer-based solid electrolyte and a conductive material, wherein at least part of surfaces of the electrode active material particles is coated with a first coating layer including a mixture of the first polymer-based solid electrolyte and the conductive material, at least part of either surfaces of the first coating layer or surfaces of the active material particles or surfaces of both is coated with the second polymer-based solid electrolyte, and the electrode active materials are bonded together in the electrode by at least one of the first polymer-based solid electrolyte or the second polymer-based solid electrolyte to form an integrated structure, and the first polymer-based solid electrolyte and the second polymer-based solid electrolyte are in a swollen state.

2. The electrode for an all solid-state battery according to claim 1, wherein the first and second polymer-based solid electrolytes are derived from a result of performing a solvent annealing process by a vaporized solvent.

3. The electrode for an all solid-state battery according to claim 1, wherein the first polymer-based solid electrolyte and the second polymer-based solid electrolytes comprise a swellable polymer.

4. The electrode for an all solid-state battery according to claim 2, wherein the vaporized solvent comprises at least one of an aprotic solvent selected from N,N-dimethylacetamide (DMAc), N-methyl pyrrolidone (NMP), dimethyl sulfoxide (DMSO) or N,N-dimethylformamide (DMF); or a protic solvent selected from water, methanol, ethanol, propanol, n-butanol, isopropyl alcohol, decalin, acetic acid or glycerol.

5. The electrode for an all solid-state battery according to claim 1, wherein the first polymer-based solid electrolyte and the second polymer-based solid electrolyte are different from each other.

6. The electrode for an all solid-state battery according to claim 5, wherein the first polymer-based solid electrolyte comprises at least one of polypropylene carbonate, a polycarbonate-based polymer electrolyte, a polysiloxane-based polymer electrolyte, a phosphazene-based polymer electrolyte or a polyether-based polymer electrolyte.

7. The electrode for an all solid-state battery according to claim 5, wherein the second polymer-based solid electrolyte comprises polyethylene oxide (PEO).

8. A method for manufacturing the electrode according to claim 1, comprising:
preparing a first coating layer slurry comprising the electrode active material particles, the first polymer-based solid electrolyte and the conductive material;
coating the first coating layer slurry on at least one surface of a current collector to prepare a first preliminary electrode;
preparing an electrolyte solution comprising the second polymer-based solid electrolyte and a solvent;
impregnating the first preliminary electrode with the electrolyte solution and drying to prepare a second preliminary electrode; and
performing a solvent annealing process on the second preliminary electrode to manufacture the electrode,
wherein the first polymer-based solid electrolyte corresponding to part of a total amount of a polymer-based solid electrolyte is put into the first coating layer slurry, and the second polymer-based solid electrolyte corresponding to a remaining amount is put into the electrolyte solution.

9. The method according to claim 8, wherein the polymer-based solid electrolyte is a polymer electrolyte formed by adding a polymer resin to a solvated lithium salt.

10. The method according to claim 8, wherein the solvent annealing process comprises:
putting the second preliminary electrode in an airtight space;
filling the airtight space with a vaporized solvent; and
maintaining the second preliminary electrode in the airtight space filled with the vaporized solvent.

11. The method according to claim 8, wherein the solvent annealing process is performed for 1 to 72 hours.

12. The method according to claim 10, wherein the vaporized solvent comprise at least one of an aprotic solvent selected from N,N-dimethylacetamide (DMAc), N-methyl pyrrolidone (NMP), dimethyl sulfoxide (DMSO) or N,N-dimethylformamide (DMF); or a protic solvent selected from water, methanol, ethanol, propanol, n-butanol, isopropyl alcohol, decalin, acetic acid or glycerol.

13. The method according to claim 8, wherein a volume of the first polymer-based solid electrolyte and the second polymer-based solid electrolyte expands by permeation of a vaporized solvent during the solvent annealing process.

14. The method according to claim 8, wherein the first polymer-based solid electrolyte and the second polymer-based solid electrolyte are different from each other.

15. The method according to claim 14, wherein the first polymer-based solid electrolyte comprises at least one of polypropylene carbonate, a polycarbonate-based polymer electrolyte, a polysiloxane-based polymer electrolyte, a phosphazene-based polymer electrolyte or a polyether-based polymer electrolyte.

16. The method according to claim 8, wherein the first coating layer slurry comprises at least one of an oxidation stabilizing additive or a reduction stabilizing additive.

17. The method according to claim 8, wherein the solvent annealing process is performed at a temperature of 20° C. to 150° C.

18. The method according to claim 13, wherein the volume of the first polymer-based solid electrolyte and the second polymer-based solid electrolyte expands at a ratio of more than 1 vol % and 1,000 vol % or less.

19. The method according to claim 8, wherein the second polymer-based solid electrolyte is included in an amount of 5 weight % to 70 weight % of the total amount of the polymer-based solid electrolyte.

* * * * *